United States Patent

Maekawa

[11] Patent Number: 4,606,371
[45] Date of Patent: Aug. 19, 1986

[54] GAS PRESSURE REGULATOR WITH REVERSIBLE SETTING ROD

[75] Inventor: Noboru Maekawa, Nakatsugawa, Japan

[73] Assignee: Mitsubishi Denki Kabushiki Kaisha, Tokyo, Japan

[21] Appl. No.: 743,724

[22] Filed: Jun. 11, 1985

[30] Foreign Application Priority Data

Jun. 21, 1984 [JP] Japan .................. 59-93011[U]

[51] Int. Cl.⁴ .......................................... F16K 31/126
[52] U.S. Cl. .................. 137/270; 137/505.41; 137/505.38
[58] Field of Search .......... 137/505, 505.11, 505.12, 137/505.13, 505.14, 505.15, 505.16, 505.17, 505.18, 505.19, 505.2, 505.21, 505.22, 505.23, 505.24, 505.25, 505.26, 505.27, 505.28, 505.29, 505.3, 505.31, 505.32, 505.33, 505.34, 505.37, 505.38, 505.39, 505.40, 505.41, 505.42, 505.43, 505.44

[56] References Cited

U.S. PATENT DOCUMENTS 678,872  7/1901  Haward .................. 137/270
3,405,927 10/1968 Drabik et al. .......... 137/505.41
3,747,629  7/1973 Bauman ................ 137/270

FOREIGN PATENT DOCUMENTS 0106611 7/1983 Japan .................... 137/505.39

Primary Examiner—Martin P. Schwadron
Assistant Examiner—John S. Starsiak, Jr.
Attorney, Agent, or Firm—Sughrue, Mion, Zinn, Macpeak and Seas

[57] ABSTRACT

A housing partitioning diaphragm type of gas pressure regulator for maintaining a different desired output pressure for different types of supply gas includes a threaded rod 7 extending into one of the housing chambers for establishing the force applied by a compression spring 8 to the diaphragm 2. To facilitate the adaptation of the regulator set pressure when changing from city gas to LPG, for example, abutment nuts 19, 22 or a flange 30 are provided on the rod intermediate its ends to determine preselected lengths by which the rod may be extended into the chamber. Thus, when changing from one type of gas to another, it is only necessary to remove, reverse, and reinsert the rod.

6 Claims, 5 Drawing Figures

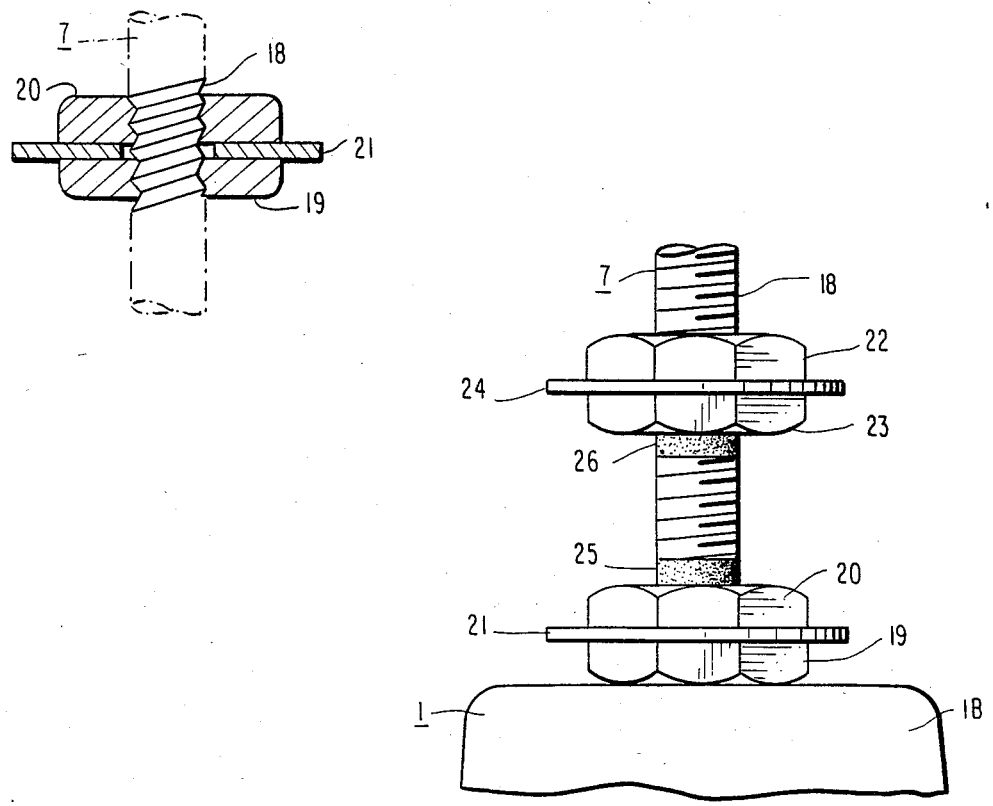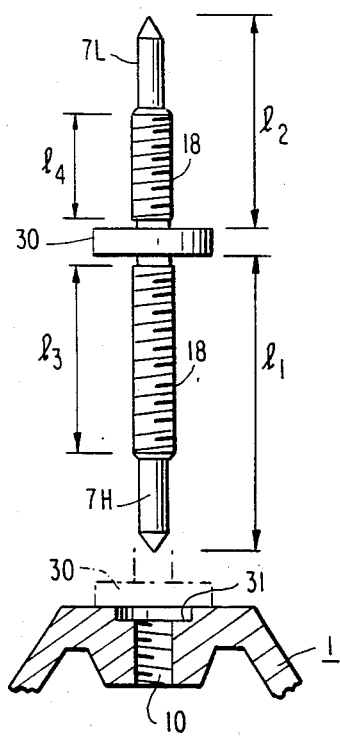
FIG. 3
FIG. 4
FIG. 5

GAS PRESSURE REGULATOR WITH REVERSIBLE SETTING ROD

BACKGROUND OF THE INVENTION

1. Field of the Invention

This invention relates to a gas pressure regulator provided with a mechanism for easily changing a set pressure value when the type of gas being supplied is changed.

2. Description of the Prior Art

A gas pressure regulator is used, for example, in the supply line of a gas burner for reducing the incoming pressure of a gaseous fuel to a predetermined regulated value. However, when the type of gas being used is converted from city gas to liquefied petroleum gas (LPG) or conversely, the regulated or secondary pressure setting must be changed to maintain desired combustion conditions.

In the past, the resetting of such secondary pressure has been carried out by measuring the secondary pressure while suitably adjusting a threaded regulating rod when the gas type conversion is made. Such a construction has been employed in gas pressure regulators disclosed in Japanese Utility Model Application Publication Nos. 92740/78 and 14839/76.

FIG. 1 schematically shows a conventional gas pressure regulator as described in the No. 92740/78 Publication, wherein reference numeral 1 designates a housing which comprises a lower cup 1A on the gas side provided with an inlet 5 and an outlet 6, and an upper cup 1B on the pressure regulating side provided with a pressure regulating rod 7 which will be described later. A diaphragm 2 is clamped between the upper and lower cups, and two spring seats 3A and 3B are provided in the central portion of the diaphragm. A valve 4 having a stem 4a is connected to the spring seat 3A.

The pressure regulating rod 7 is mounted in a threaded hole 10 in the upper cup 1B, and carries a spring seat 9 at one end for engaging a pressure regulating spring 8 disposed between it and the seat 3B. Reference numeral 11 designates a supply source for city gas or LPG, 12 is a gas supply valve, 13 is an electromagnetic valve, 14 is a gas burner, 15 is a gas line, $P_1$ is the primary gas pressure, and $P_2$ is the secondary gas pressure.

In such a conventional gas pressure regulator the adjustment or resetting of the secondary pressure $P_2$ is accomplished by screwing the pressure regulating rod 7 in or out while measuring the secondary pressure with a gauge. Such mode of adjustment is obviously troublesome and time consuming.

SUMMARY OF THE INVENTION

This invention overcomes the disadvantages noted above by providing an arrangement in which one end of a pressure regulating rod is used for city gas whereas the other end is used for LPG; when the gas type is converted the necessary resetting of the secondary pressure supplied by the regulator is made by merely reversing the insertion direction of the rod.

BRIEF DESCRIPTION OF THE DRAWINGS

FIG. 3 is an enlarged sectional view of a portion of FIG. 2;

FIG. 4 is an enlarged side view of a portion of FIG. 2; and

FIG. 5 is an explanatory side view of a modified embodiment of a pressure regulating rod and housing section in accordance with the invention.

DETAILED DESCRIPTION OF THE PREFERRED EMBODIMENTS

Figure 2:
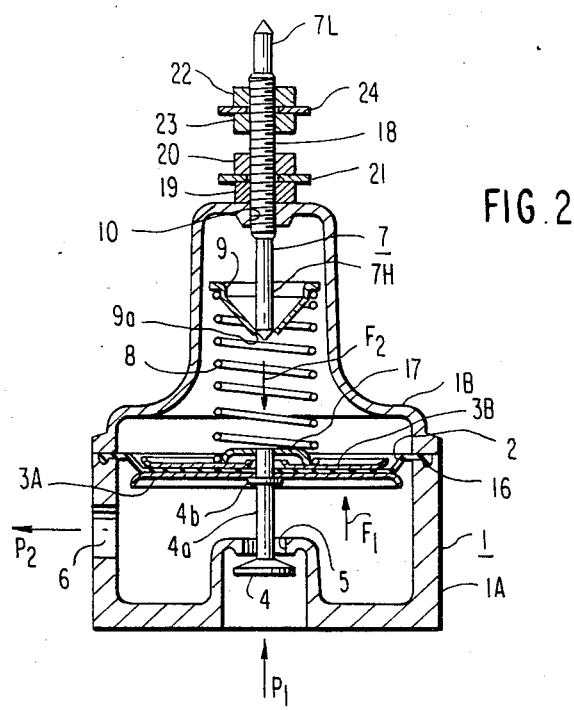
FIG. 2 is a sectional elevation of a central portion of a gas pressure regulator according to one embodiment of the present invention.

Referring to FIG. 2, a housing 1 comprises a lower cup 1A on the gas side defining an inlet 5 and an outlet 6, and an upper cup 1B on the pressure regulation side. A diaphragm 2 partitions the interior of the housing into upper and lower chambers, a peripheral edge thereof being inserted into a groove 16 formed in a superposed surface of the lower cup 1A such that the diaphragm is clamped between the two cups. Although not specifically illustrated, the upper chamber is in communication with the atmosphere through an aperture in the cup 1B, for example. A valve body 4 for opening and closing the inlet 5 has a stem 4a integral therewith and connected to the diaphragm 2. Spring seats 3A and 3B in the form of plates are provided opposite each other on the upper and lower surfaces of the diaphragm. They are held from above and below by a projection 4b integral with the valve stem 4a and a keeper plate 17 secured to the upper end of the stem.

A pressure regulating rod 7 is screwed into a tapped hole 10 in the upper cup 1B, and a compression spring 8 for regulating the secondary pressure $P_2$ is disposed between an inverted conical seat 9 mounted on the upper end thereof and the spring seat 3B. Both ends of the rod are conically machined to seat in a hole 9a formed in the center of the spring seat 9. The pressure regulating rod 7 has a central external thread 18 flanked by end portions of smaller diameter. The longest such end portion 7H provides a high secondary pressure, as detailed below, and the shortest portion 7L establishes a low secondary pressure. Reference numerals 19, 20 and 22, 23 designate nut pairs screwed onto the external thread 18, and 21, 24 are washers interposed between the respective nut pairs. The valve 4, compression spring 8, spring seat 9 and pressure regulating rod 7 are coaxial.

FIG. 3 is an enlarged sectional view showing the pressure regulating rod 7, the nuts 19 and 20 and the washer 21 shown in FIG. 2. FIG. 4 is likewise an enlarged view of an essential part of FIG. 2, wherein reference numerals 25 and 26 designate predetermined position marks indicated with paint or the like on the pressure regulating rod.

Figure 1:
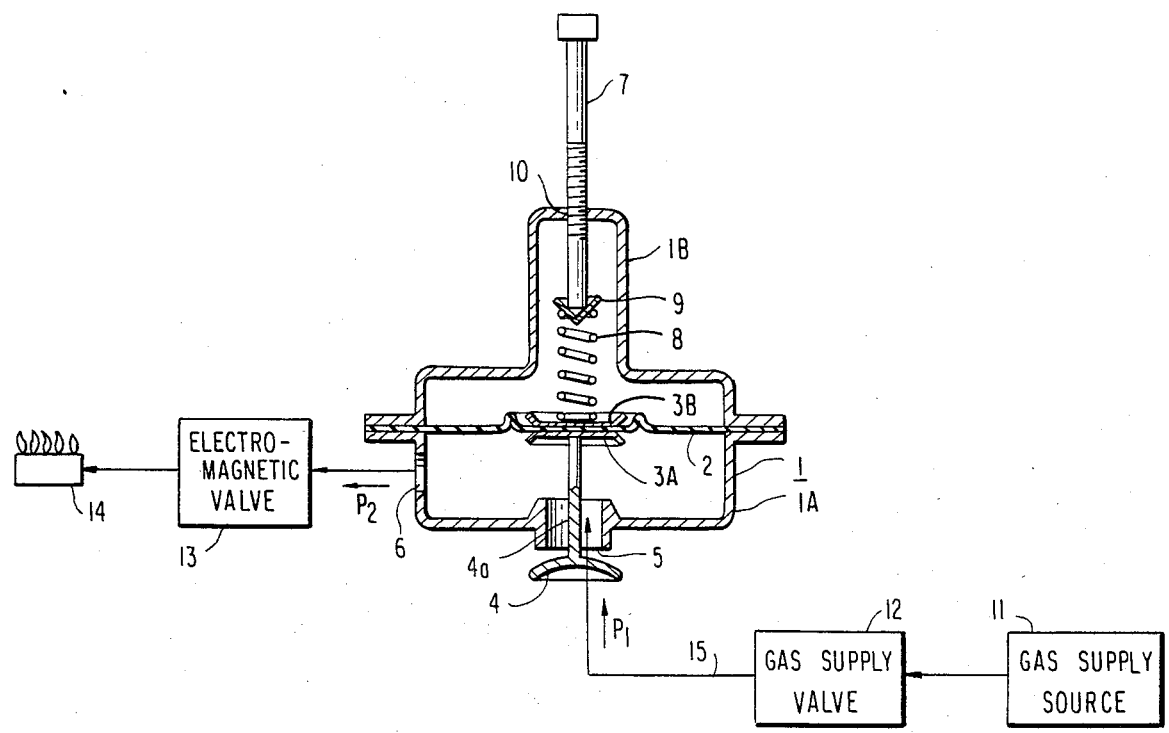
FIG. 1 is a sectional elevation of a conventional gas pressure regulator.

The described gas pressure regulator is connected to a gas line 15 as schematically shown in FIG. 1, for example. The pressure regulating rod 7 as shown in FIG. 2 is set to obtain a high secondary pressure since the compression spring 8 is urged by the long end 7H of the rod. Accordingly, when liquefied petroleum gas is supplied to the inlet 5, its pressure is reduced to a predetermined secondary level $P_2$ by the balance between an upward force $F_1$ due to the primary pressure $P_1$ and a downward force $F_2$ due to the spring 8 and the weight of the diaphragm 2, the spring seats 3A, 3B and 9 and the keeper plate 17, and it exits through the outlet 6.

As the compressive force of the spring 8 increases, the set pressure of the valve 4 and attendantly the secondary pressure $P_2$ is correspondingly increased, and thus the "screw-in" amount of the rod 7 may be varied to regulate the secondary pressure $P_2$.

When the gas supplied to the regulator is changed from LPG to city gas, the rod 7 is unscrewed from the housing 1, the short end 7L is inserted into the hole 10, and the rod is screwed in until the nut 22 abuts the upper surface of the housing. In this mode the degree to which the spring 8 is compressed by the rod 7 is less than in the case of LPG, and the regulated secondary pressure $P_2$ is attendantly reduced. In a specific example, if $P_1$ is 280 mmH$_2$O for LPG the regulated value of $P_2$ is 200 mmH$_2$O, whereas in the case of city gas $P_1$ is 200 mmH$_2$O and $P_2$ is reduced to 60 mmH$_2$O.

On the premises that the type of gas may be changed as described above and that each such gas has a standard supply pressure, the pressure regulating rod nut settings may be preselected during manufacture such that when the rod is inserted to the predetermined position the desired secondary pressure $P_2$ is obtained. The cumbersome and repetitious pressure sensing and adjustment task of the prior art is thus avoided.

In the above-described embodiment the abutment nuts 19 and 22 are positively positioned by their lock nuts 20, 23 and washers 21, 24. The positions of the nuts and washers may be changed along the external thread 18 to effect the fine adjustment of the secondary pressure $P_2$, however, in a considerably easier manner than in the prior art owing to the presence of the position marks 25, 26.

FIG. 5 shows a modified embodiment of the pressure regulating rod 7 and the tapped hole 10 of the housing 1, wherein an integral flange 30 is provided in the mid portion of the rod, and both the upper and lower surfaces of the flange comprise abutment stops. When the rod is inserted into the hole 10 and screwed down until one surface of the flange 30 abuts the housing, the desired secondary pressure $P_2$ is set since the lengths $l_1$ and $l_2$ from the flange to both ends are designed to establish such pressures for city gas and LPG. The ranges $l_3$, $l_4$ of the external thread 18 terminate short of the flange, but since an enlarged diameter recess 31 is formed at the inlet of the hole 10 the rod 7 may still be screwed in until the flange abuts the housing.

If the flange 30 has a square or hexagonal shape a wrench may be used to rotate the rod, whereas if the flange 30 is round its periphery may be knurled to enable finger manipulation.

What is claimed is:

1. A gas pressure regulator, comprising: a housing (1), a flexible diaphragm (2) mounted within the housing and dividing it into first and second chambers, a gas inlet (5) and a gas outlet (6) defined in housing walls of the first chamber, a valve (4) disposed in the gas inlet and connected to the diaphragm for movement thereby, biasing means (8) disposed in the second chamber for imparting a force to the diaphragm in a direction to open the valve, and a pressure regulation level setting rod (7) extending into the second chamber and positively engaging the biasing means for varying the force imparted to the diaphragm by the biasing means, wherein the rod is elongate, has first and second opposite ends, and abutment means (19, 22; 30) are provided on the rod intermediate said ends for establishing predetermined lengths by which each of said ends may be selectively extended into the second chamber to establish desired gas outlet pressures for two different types of gas which may be supplied by inserting an appropriate end of the rod into the second chamber to a length determined by the abutment means.

2. The gas pressure regulator as defined in claim 1 wherein said housing is formed by connecting a first cup member (1A) having an open side to a second cup member (1B) having an open side with said open sides opposed to each other and the diaphragm clamped therebetween.

3. The gas pressure regulator as defined in claim 1 wherein said valve, said pressure regulating rod and said biasing means are coaxial.

4. The gas pressure regulator as defined in claim 1 wherein portions of said pressure regualting rod flanking said abutment means are threaded (18), and said housing has a tapped hole (10) with which said threads are engaged during the insertion of the rod.

5. The gas pressure regulator as defined in claim 1 wherein said abutment means comprises a flange (30) formed integrally with the rod, said flange being brought into abutment with the housing to control the insertion length of the rod.

6. The gas pressure regulator as defined in claim 4 wherein the abutment means comprises spaced lock nut pairs threadedly engaged with said rod.

* * * * *